(No Model.)

H. N. HAMILTON.
AXLE BEARING.

No. 510,255. Patented Dec. 5, 1893.

WITNESSES:
C. Neveux
G. Sedgwick

INVENTOR
H. N. Hamilton
BY Munn & Co.
ATTORNEYS.

UNITED STATES PATENT OFFICE.

HENRY NICOLL HAMILTON, OF YONKERS, NEW YORK.

AXLE-BEARING.

SPECIFICATION forming part of Letters Patent No. 510,255, dated December 5, 1893.

Application filed January 26, 1893. Serial No. 459,869. (No model.)

*To all whom it may concern:*

Be it known that I, HENRY NICOLL HAMILTON, of Yonkers, in the county of Westchester and State of New York, have invented a new and Improved Axle-Bearing, of which the following is a full, clear, and exact description.

My invention relates to improvements in axle bearings.

The object of my invention is to produce a cheap, simple, efficient bearing which is practically self oiling; that is, which will run for a very long time without oiling, which will keep the axle spindle well oiled, and is constructed in such a way as to exclude dust and to run very easily.

To this end my invention consists in certain features of construction and combinations of parts, which will be hereinafter described and claimed.

Reference is to be had to the accompanying drawings forming a part of this specification, in which similar figures of reference indicate corresponding parts in all the views.

Figure 1:
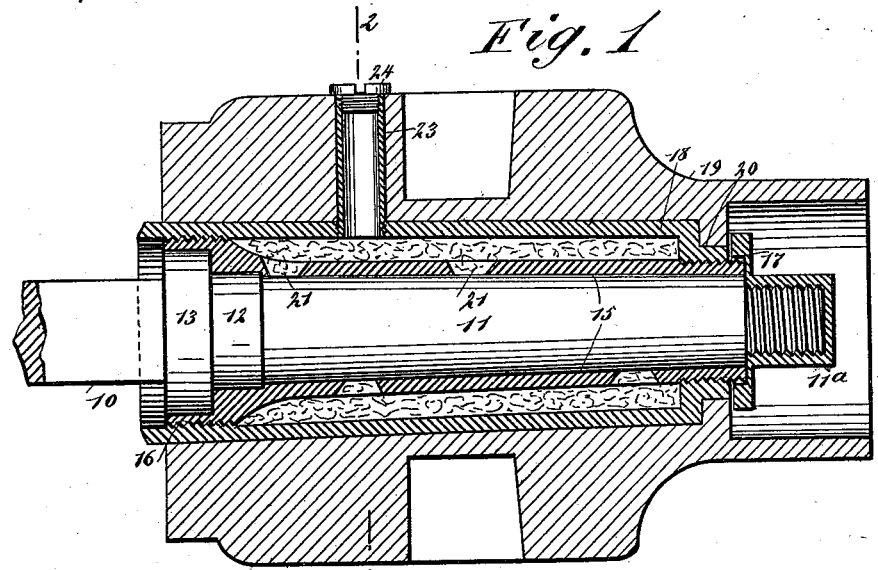
Figure 2:
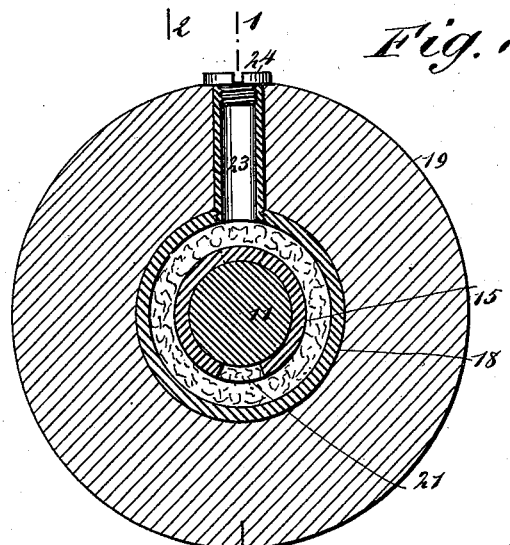
Figure 3:
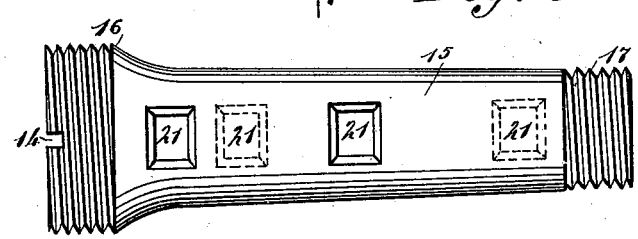

Figure 1 is a longitudinal section of the bearing embodying my invention, on the line 1—1 in Fig. 2. Fig. 2 is a cross section on the line 2—2 in Fig. 1; and Fig. 3 is a detail view of the axle skein.

The axle 10 is of the usual kind and terminates in a bearing spindle 11 which at its outer end is reduced and screw threaded in the ordinary way to receive the fastening nut 11$^a$. At its inner end the spindle terminates in a plurality of collars 12 and 13, of progressively increasing diameter, and the spindle is enveloped by the skein 15, which is shaped interiorly to fit the spindle and it is enlarged and screw threaded at its inner end, as shown at 16, and is also screw threaded at its outer end, as shown at 17, this construction enabling it to be screwed into the box 18 of the wheel hub 19. The inner end of the skein is slotted at 14 to provide for applying a wrench to it so that it may be screwed to place, or removed when it is necessary to replace the waste which is held around the skein. A new skein may be also in this way substituted for an old and worn one. The threads on the skein may be right and those on the box left, or vice versa, to prevent the parts from becoming loose by the movement of the wheel. The box 18 is reduced at its outer end, as shown at 20, and this reduction, in connection with the enlargement 16 of the inner end of the skein, causes an annular chamber to be formed between the central portion of the skein and box, this chamber being closed tightly at the ends by the joints between the box and skein. The chamber is adapted to be filled with oil and with cotton waste, or other similar absorbent, which will take up the oil and prevent too much of it from being at once applied to the spindle. In the walls of the skein are holes 21 through which the oil oozes as it passes from the chamber in the hub to the bearing spindle.

A tube 23 leads from the box 18 to the outer surface of the hub and through this tube the box is filled with oil, and the tube is provided with a screw plug 24 which prevents the oil from flowing out and the dirt from passing in. It will be readily understood that the form and size of the hub may be varied indefinitely without departing from the principle of my invention.

When the bearing is to be used, the box 18 is filled with oil through the tube 23, the plug 24 is inserted, and after this the wheel may be run for a long time without heating the axle.

Having thus described my invention, I claim as new and desire to secure by Letters Patent—

The combination, with an axle provided with a plurality of collars, of a hub provided with a box having its ends internally screw threaded, the outer end being reduced, a tube leading from the box through the hub, and an apertured skein having its ends externally screw threaded, the inner end being enlarged and provided with internal shoulders to fit upon the collars of the axle, substantially as shown and described.

HENRY NICOLL HAMILTON.

Witnesses:
WARREN B. HUTCHINSON,
C. SEDGWICK.